Nov. 10, 1931.  S H H. KUENZEL  1,831,628
VEHICLE MOTOR MOUNTING
Filed Nov. 12, 1926   2 Sheets-Sheet 1

INVENTOR
BY S. H. Hunter Kuenzel
Moses & Nolte
ATTORNEYS

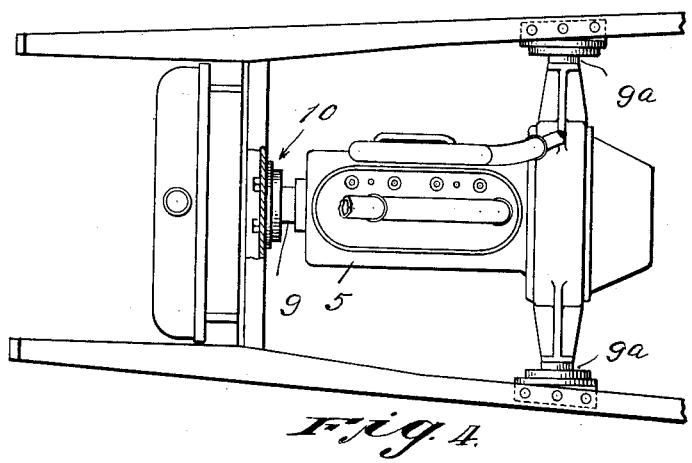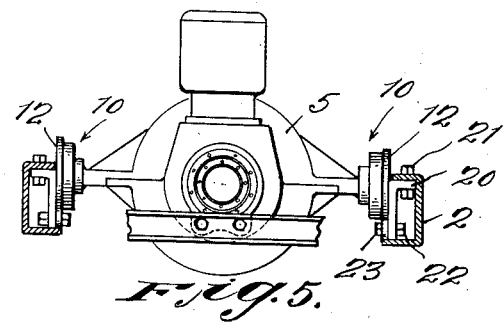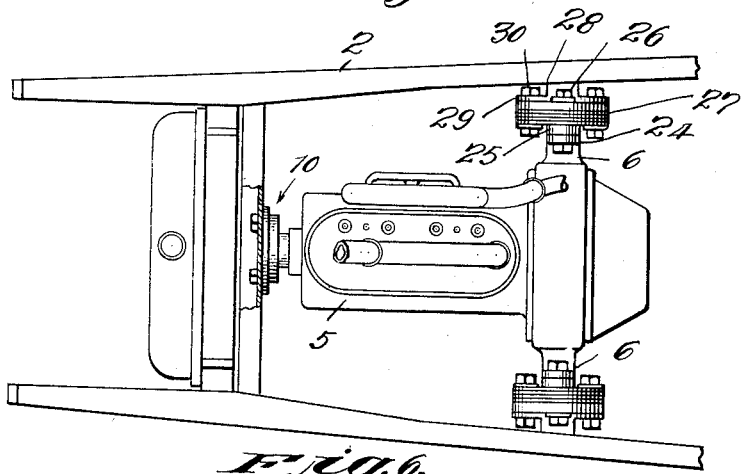

Patented Nov. 10, 1931

1,831,628

UNITED STATES PATENT OFFICE

S H HUNTER KUENZEL, OF KALAMAZOO, MICHIGAN

VEHICLE MOTOR MOUNTING

Application filed November 12, 1926. Serial No. 147,909.

This invention relates to mountings for vehicle motors and has for its principal object to provide a vehicle motor mounting for preventing extensive movements of the motor with relation to the frame but constructed to permit vibration of the motor without transmitting such vibration to the frame, and to relieve twisting strains.

A more specific object of the invention is to provide a motor mounting comprising a support for limiting bodily movement of the motor in any direction transverse to its axis and capable of absorbing shocks transmitted from the motor in any direction, in combination with opposed supporting means adjacent the opposite end of the motor for resisting the driving torque and the end thrust of the motor.

The invention is applicable in its broader aspects to the mounting of other bodies than vehicle motors.

Other features and advantages will hereinafter appear.

In the drawings:

Figure 4 is a view similar to Figure 3 of another embodiment of the invention, wherein the rear motor supports are similar to the support at the forward end of the motor;

Figure 5 is a sectional front elevation of the motor shown in Figure 4; and

Figure 6 is a plan view partly broken away, showing a further embodiment of the invention.

Figures 1, 2:
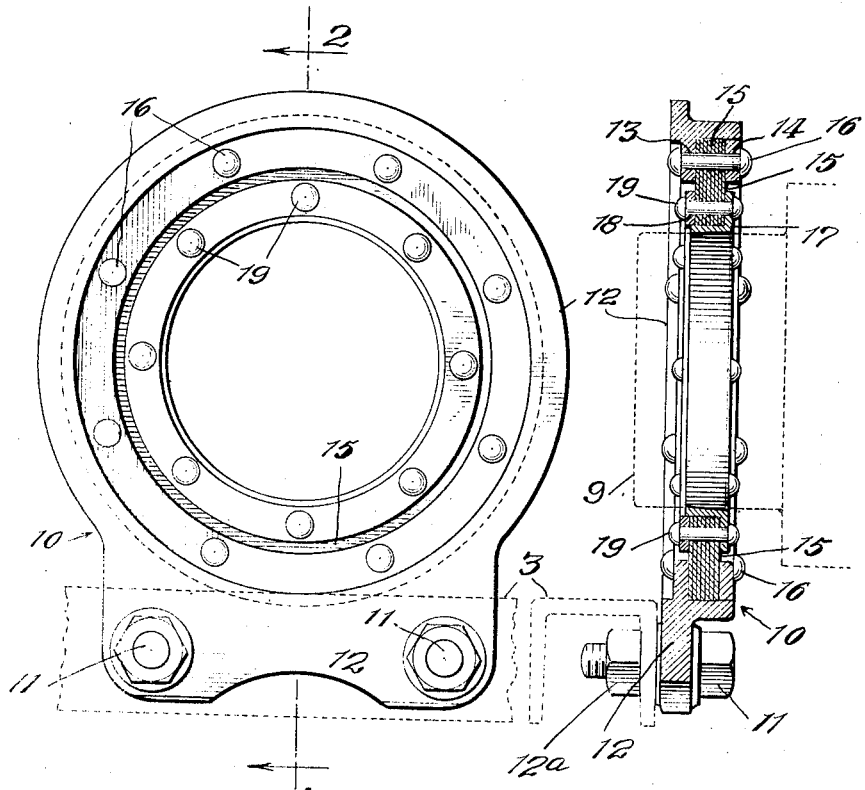
Figure 1 is a front elevation of the support employed in the illustrative embodiment at the front end of the motor.
Figure 2 is a vertical section on the line 2—2 of Figure 1 looking in the direction of the arrows.
Figure 3:
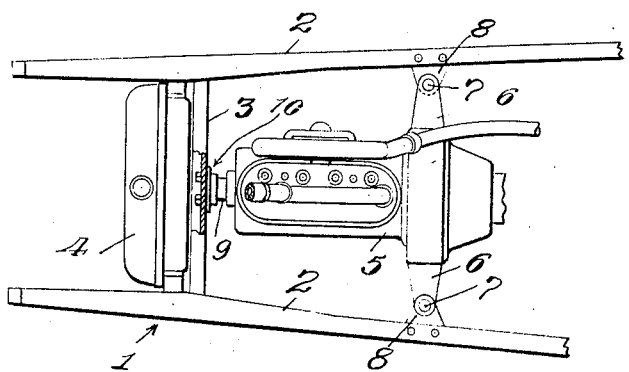
Figure 3 is a fragmentary plan view on a smaller scale than Figures 1 and 2 showing the motor and frame assembly.

The invention is illustrated as embodied in a motor vehicle having a frame 1 which comprises longitudinal side bars 2 and a transverse connecting bar 3. A radiator 4 is mounted upon the frame as usual in any suitable manner.

The motor casing 5 is provided with outreaching arms 6 near its rear end which are connected by any suitable means such as bolts 7 with brackets 8 mounted on the side members 2.

The motor mounting is completed by mounting a slightly tapering boss or projection 9 on the forward end of the motor casing in a novel support 10 which is secured by bolts 11 and nuts 12ª upon the cross frame member 3. This support comprises a rigid bracket 12 which may rise from the frame member 3 and form a substantially circular collar. This collar is provided with an inwardly extending flange 13 for cooperating with a clamping ring 14 in clamping the outer portion of a collar or plate 15 of rubberized fabric or other suitable shock absorbing, inelastic, non-metallic material. Rivets 16 or other suitable means secure the clamping ring 14 to the flange 13. A circular ring 17, L-shaped in cross section, engages the rear face and the inner circumferential face of the fabric ring 15. A circular clamping plate 18 engages the front face of the fabric ring and is secured in clamping relation thereto by rivets 19 passed through the rings 17 and 18 and through the fabric ring 15. The ring 17 is of a diameter to snugly fit the hub or boss 9 on the motor casing and its bore is slightly tapering from rear to front to form a wedging fit with the hub 9. The ring is therefore arranged to support the motor casing without permitting free play and rattling thereof.

With the construction described the motor is held against substantial movement relative to the frame in all directions, yet the vibrations set up by the operation of the motor are not transmitted violently to the frame. The fabric ring 15 is not readily compressible or extensible in its own plane so that very little vertical or side play is permitted. It is sufficiently flexible, however, to permit slight tilting of the motor about diameters of the support 10 as axes. The diameter of the external collar may be made to provide any extent of unclamped fabric desired, in accordance with the extent of play to be permitted to the motor.

The connections at the rear of the motor casing are located far out from the motor shaft, and may resist the driving torque without having an excesive strain thrown upon them. The support 10 is not, therefore, subjected to severe twisting strains, but principally to forces tending to bodily displace the forward end of the motor in directions transverse to the motor axis. As the fabric collar completely surrounds the hub 9 any such forces act to directly compress or extend the fabric and do not set up any substantial torsional stresses tending to rupture it.

In the form of the invention shown in Figures 4 and 5 the motor casing 5 is provided with a hub 9 at its forward end and with similar hubs 9a at opposite sides of its rear end. The mounting at the forward end in this form of the invention is exactly like that disclosed in Figure 1 and so, also, is the mounting at each side of the rear ends. At the rear ends of the motor the brackets 12 are rigidly carried by angle brackets 20 which are secured within the channel frame members 2 by suitable securing means shown at 21. The brackets 12 are clamped to the angle brackets 20 by clamping bolts 22 and nuts 23 and form parts of supports 10 like the one already described.

In the form of the invention shown in Figure 6 the motor 5 is mounted at its forward end in a support 10, which is the same in all respects as the support 10 of Figure 1. At its rear end oppositely extending arms 6 of the motor casing are provided with vertically extending webs 24 at their outer ends which, together with clamping plates 25, are connected at their upper and lower ends by bolts 26 with rubberized fabric plates 27. Brackets 28 carried by the side frame members 2 have oppositely extending ears 29 at their inner ends which are connected by bolts 30 with the rubberized fabric plates 27. This mounting at the rear end of the motor is the same as that disclosed in the pending application of Harvy W. Bell, Serial No. 596,250, filed October 23, 1922, for flexible connections for motor vehicles, now Patent #1,727,804.

Variations may be resorted to within the scope of the invention and parts of the improvements may be used without others.

What I claim is:

1. In a motor vehicle the combination with the vehicle frame and a motor casing having a supporting base thereon, of means for mounting the motor casing on the frame comprising a support including a supporting collar, means detachably securing said collar to the frame, a supported collar fitting the boss on the motor casing but separable therefrom, and flexible inelastic shock absorbing material connecting and spacing said collars.

2. In a motor vehicle the combination with the vehicle frame and a motor casing, of means for mounting the casing on the frame comprising a collar detachably secured to the frame, a collar embracing a portion of the motor casing but separable therefrom and flexible, inelastic fabrics connecting said collars.

In testimony whereof I have affixed my signature to this specification.

S H HUNTER KUENZEL.

CERTIFICATE OF CORRECTION.

Patent No. 1,831,628.                              Granted November 10, 1931, to

S H HUNTER KUENZEL.

It is hereby certified that error appears in the printed specification of the above numbered patent requiring correction as follows: Page 2, line 53, claim 1, for "base" read boss; and that the said Letters Patent should be read with this correction therein that the same may conform to the record of the case in the Patent Office.

Signed and sealed this 22nd day of December, A. D. 1931.

(Seal)

M. J. Moore,
Acting Commissioner of Patents.